Jan. 9, 1951 P. W. GARBO 2,537,044
CONTINUOUS METHODS OF PRODUCING OXYGEN INVOLVING THE
USE OF A THERMOPHORE AND THE PURGING THEREFOR
Filed Nov. 29, 1946 3 Sheets-Sheet 1

INVENTOR
Paul W. Garbo
BY
Benjamin Sweedler
ATTORNEY

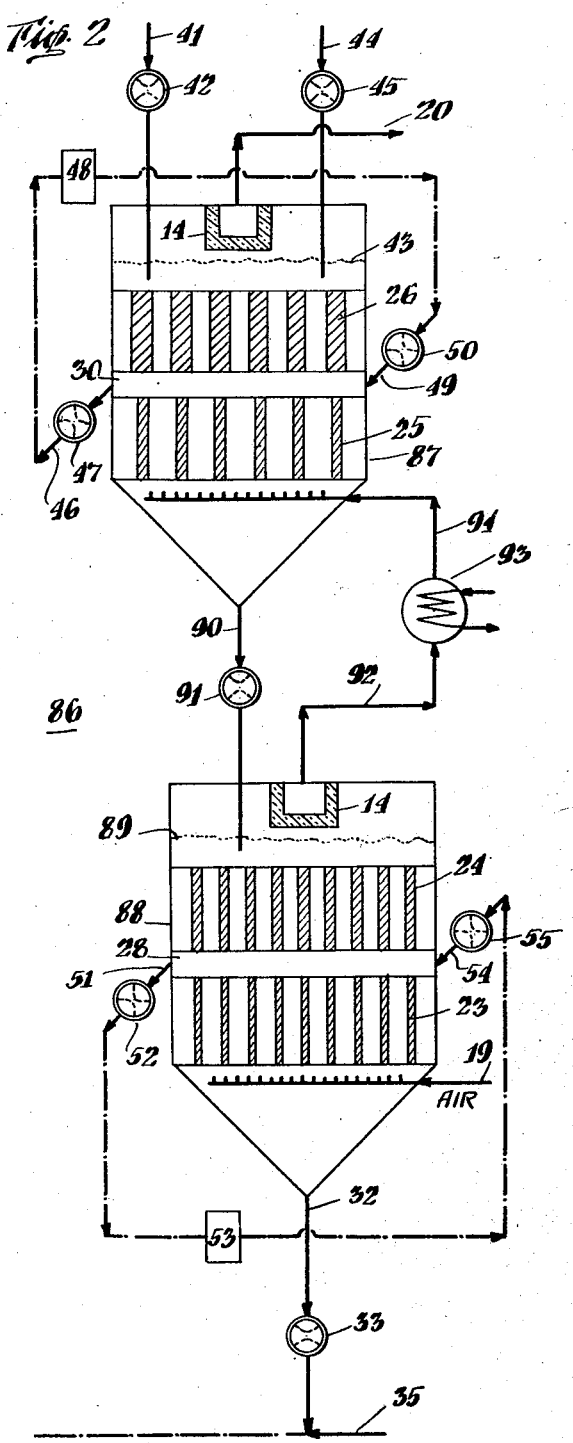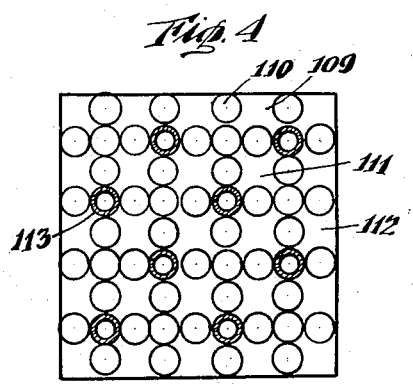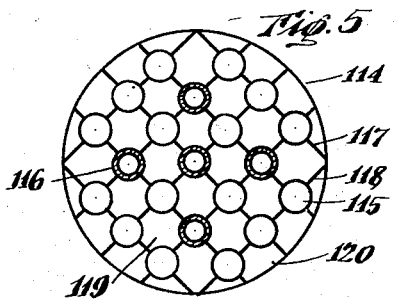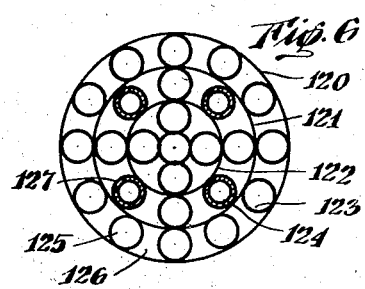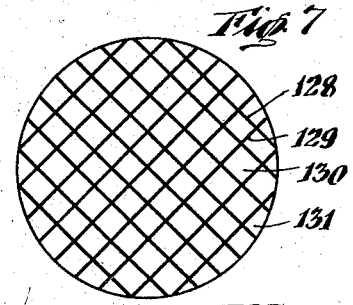
INVENTOR
*Paul W. Garbo*
BY
*Benjamin Sweedler*
ATTORNEY

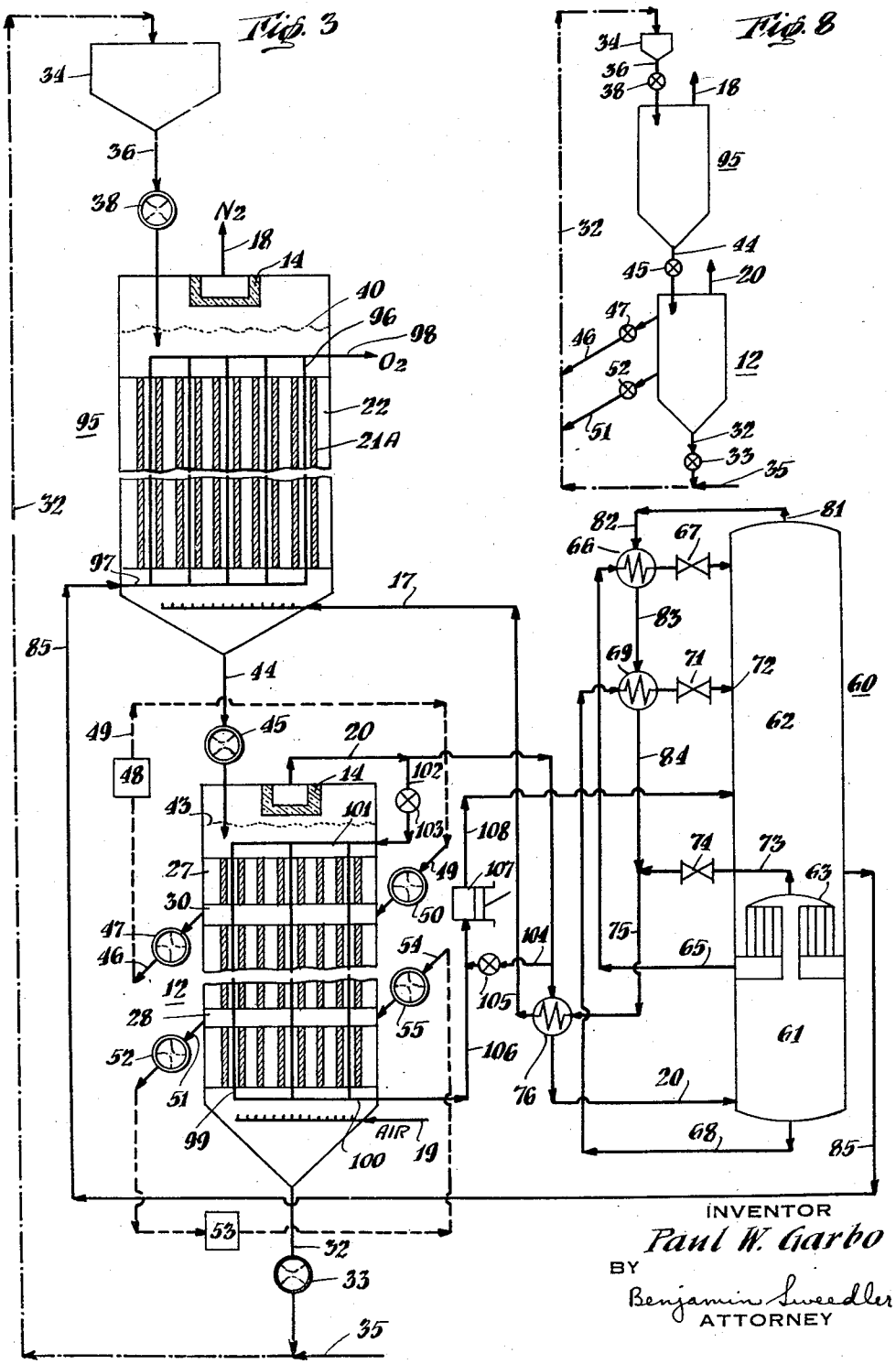

Patented Jan. 9, 1951

2,537,044

UNITED STATES PATENT OFFICE 2,537,044

CONTINUOUS METHOD OF PRODUCING OXYGEN INVOLVING THE USE OF A THERMOPHORE AND THE PURGING THEREOF

Paul W. Garbo, Freeport, N. Y., assignor to Hydrocarbon Research, Inc., New York, N. Y., a corporation of New Jersey Application November 29, 1946, Serial No. 713,124

19 Claims. (Cl. 62—175.5)

1

This invention relates to the production of oxygen by the liquefaction and rectification of air, and more particularly to the production of oxygen of high purity and in high yield without the use of chemical reagents to effect the removal of carbon dioxide and moisture present in air.

All temperatures herein are in degrees F. and pressures in pounds per square inch gauge.

Oxygen is commonly produced by liquefaction of air and rectification at low temperatures; preferably rectification is conducted in two stages at different pressures. The refrigeration necessary for liquefaction is supplied to the air after it has been compressed and water-cooled to approximately room temperature, by indirect heat exchange with the effluent products of rectification. An additional amount of refrigeration is supplied to compensate for cold losses resulting from the difference in enthalpy between the incoming air and the outgoing products of rectification and for heat leaks into the system. For economical operation it is essential to recover the cold content of the outgoing products of rectification. This is usually accomplished by passing these products in heat transfer relationship with the incoming air.

In older systems in order to avoid deposition of frost and solid carbon dioxide in the tubular countercurrent heat exchangers through which the air is passed in indirect heat exchange relation with the outgoing products of rectification, the air which invariably contains about .03% by volume of carbon dioxide and varying quanities of moisture is treated in driers and caustic scrubbers to remove the water and carbon dioxide prior to admittance of the air into the heat exchangers. Even with this treatment the exchangers had to be thawed out regularly to remove the frost (which term is used in a generic sense to include both snow and ice) which, unless removed, caused stopping up of the apparatus.

It has also been suggested to use cold accumulators or regenerators (hereinafter referred to as heat exchangers) of large cold absorbing capacity through which the warm incoming air and the cold outgoing products of rectification are alternately passed with periodically reversed operation so that streams of warm air are flowed through the same packing-filled spaces as the cold separated oxygen and nitrogen traversed during the previous step in the process, the impurities, such as carbon dioxide, deposited in these spaces during the passage of air therethrough being removed by sublimation during the subsequent flow in a reverse direction of the products of rectification. The use of these reversing heat exchangers in a process in which the air is compressed to relatively high pressure results in more costly operation from the standpoint of horsepower requirements because upon every reversal, which may take place every three minutes, the volume of compressed air in the heat exchangers is lost and must be again replaced. Moreover, in the operation of such reversing heat exchangers it is important not to let the temperature at the exit end of the exchangers drop to a point where a part of the air becomes liquid because this liquid adheres to the surface of the exchangers and is wasted upon reversal of flow. On the other hand the temperature conditions under which the exchangers are operated should be such as to obtain complete purging of the carbon dioxide deposited therein upon reversal of flow which usually requires having the air exit end of at least one of the exchangers at a low temperature, i. e., at or near the dew point of air.

Recently it has been suggested to use cold exchangers involving passages of relatively small cross-sectional area, which passages are provided with closely spaced fins of foil-like metal of high heat conductivity to provide an exceptionally high surface area of cold exchanger surface per unit of volume of exchanger space through which passages flow in indirect heat exchange relationship the air and the oxygen and nitrogen products of rectification. Periodically the flow of the air and the nitrogen is reversed, i. e., switched, through suitable manifold connections so that the nitrogen flows through the passages through which had passed the air and the air flows through the passages through which had passed the nitrogen during the preceding step of the process. Operating in this manner the nitrogen stream removes by sublimation the carbon dioxide and frost deposited during the preceding step of the process so that complete purging of carbon dioxide and frost is obtained on each reversal of flow.

It is an object of the present invention to provide a process for producing oxygen by the liquefaction and rectification of air in which a condensible constituent such as moisture, carbon dioxide, hydrogen sulfide, sulfur dioxide or hydrocarbon vapors invariably present in atmospheric air, preferably substantially all such condensible constituents are removed from the air without the use of chemical reagents and which provides for more efficient transfer of cold from the outgoing nitrogen or oxygen or both nitrogen and oxygen products of rectification to the incoming air stream than prior known procedures. Of the condensible constituents above enumerated moisture and carbon dioxide are the constituents most commonly found in air and which must be substantially completely removed for satisfactory production of oxygen.

Another object is to provide such process for producing oxygen in which transfer of cold from the outgoing products of rectification to the incoming air is effected most efficiently and purging of one or more of the condensible constituents removed from the air stream is accomplished so as to permit continuous operation of the equipment in which the process is carried out.

Other objects and advantages of this invention will be apparent from the following detailed description thereof.

In accordance with this invention a mass of thermophore particles is passed in a generally downward direction and in a state of dense phase fluidization countercurrent to an upwardly flowing stream of a rectification product which maintains the thermophore in the aforesaid state of dense phase fluidization so that in effect each solid particle of thermophore is contacted and vigorously agitated by the rectification product stream, thereby insuring intimate contact between the powdered thermophore particles and the rectification product stream, promoting maximum cold exchange therebetween, while maintaining a descending temperature gradient in the rectification product stream so that the thermophore is efficiently chilled by the rectification product. Due to the unusually efficient cold transfer taking place in the process of this invention, the temperature approach between the incoming rectification product and the exiting thermophore particles may be made as low as 3° F. or even less. The thus chilled thermophore particles are then passed in a state of dense phase fluidization countercurrent to a rising stream of air in a second zone while maintaining a descending temperature gradient in the air stream and an ascending temperature gradient in the thermophore stream. At one or more spaced points along the path of flow of the thermophore stream in the second zone a portion of the thermophore particles is withdrawn, and either treated to effect removal therefrom of condensible constituent or constituents removed from the air stream and the thus purged thermophore particles reintroduced into the thermophore stream, thereby preventing the building up of condensible constituents in the thermophore stream to an extent that would interfere with the flow thereof in a state of dense phase fluidization downwardly countercurrent to the ascending air stream, or the withdrawn particles are reintroduced into the exchanger system and purged of condensible constituents within the system as more fully disclosed hereinafter.

In the preferred embodiment of the invention a stream of nitrogen product of rectification at a temperature close to that at which it leaves the rectification system and a pressure of from about 2 to about 10 pounds is passed upwardly through a zone through which flows downwardly through a multiplicity of longitudinally extending channels a thermophore stream in a state of dense phase fluidization while maintaining a descending temperature gradient in the thermophore stream and an ascending temperature gradient in the nitrogen stream, the thermophore stream leaving this zone at a temperature approaching that, say within 3° F., of the incoming nitrogen stream. The oxygen product of rectification may be passed through the same exchanger in cold exchange relationship with the thermophore passing downwardly countercurrent to the nitrogen or through a separate exchanger from that through which the nitrogen passes but in any event the cold content of the oxygen as well as that of the nitrogen is recovered. The thus chilled thermophore stream passes down in a state of dense phase fluidization through a second zone countercurrent to a rising stream of air at a pressure of from about 60 to about 100 pounds gauge and usually at an initial temperature of from about 70° to about 110° F. while maintaining an ascending temperature gradient in the thermophore stream and a descending temperature gradient in the air stream. In the region in the upper portion of thermophore stream in the second zone where condensation of carbon dioxide takes place, a portion of the thermophore is withdrawn, treated to effect removal of carbon dioxide and reintroduced into the system at any desired point, usually in the second zone near the point from which it was withdrawn, thereby avoiding accumulation of carbon dioxide in the upper portion of the thermophore stream. Generally, the thermophore to be purged of carbon dioxide is withdrawn from the second zone at a point where the temperature is from about −200° to about −240° F. At a lower point in the thermophore stream in the second zone where the temperature may be in the neighborhood of from about 30° to about −10° F. a portion of the thermophore stream is again withdrawn, treated to effect removal of frost and reintroduced into the system, say at the lower portion of the thermophore stream near the point from which it was withdrawn, to avoid accumulation of frost in the lower portion of the thermophore stream, such as would interfere with the flow of the thermophore stream in the state of dense phase fluidization downwardly through the second mentioned zone. The air leaves the second mentioned zone at a temperature approaching, say within 3° F. of, that of the incoming thermophore stream, and at a pressure slightly less than that at which it was introduced into the second zone.

By "thermophore" is meant a comminuted solid material of high heat absorbing and heat transfer capacity; copper, aluminum and other metals and alloys of high heat absorbing and transfer capacity will be found suitable. It is advantageous in the practice of this invention that the thermophore be in the form of a powder, substantially all of which passes a 100-mesh screen. For best results, substantially all of the powder will usually pass through a 200-mesh screen and contain at least 65% of particles passing through a 325-mesh screen. The particle size in any given system will depend upon the density of the material of the particles, the shape of the particles, the density and velocity of the gaseous fluidizing medium, etc.; the optimum particle size for any system is readily determinable by simple preliminary experiments conducted under conditions simulating those of actual operation.

The thermophore is maintained in each of the two zones in a state of dense phase fluidization, i. e., the thermophore in each of the two zones is subjected to a rate of gaseous flow therethrough, such that a bed or mass thereof is maintained in each zone, each of the particles of the bed or mass being suspended in the gas and exhibiting relatively random movement, and such that the upper surface of the bed or mass assumes a level, commonly known as a pseudo-liquid level, substantially above the normal level of the settled thermophore.

During the flow of the gaseous medium through the bed or mass of thermophore in each of the zones, the individual particles rise and fall, the general direction of movement of the particles, however, being downwardly so that as the operation of the process progresses, incoming particles of thermophore form the upper surface of the mass and these particles gradually progress downwardly until they reach the exit, where they are withdrawn.

This state of fluidization, in which the particles are maintained in a vigorous state of agitation, i. e., in a condition resembling "boiling", with the upper surface of the mass or bed thereof substantially above the normal level of the settled thermophore, is herein designated as "dense phase" fluidization.

In the accompanying drawings forming a part of this specification and showing for purposes of exemplification, preferred forms of apparatus for practicing this invention:

Figure 2 is a vertical section through a pair of exchangers for flow of the air stream in cold exchange relationship with the thermophore stream;

Figure 1:
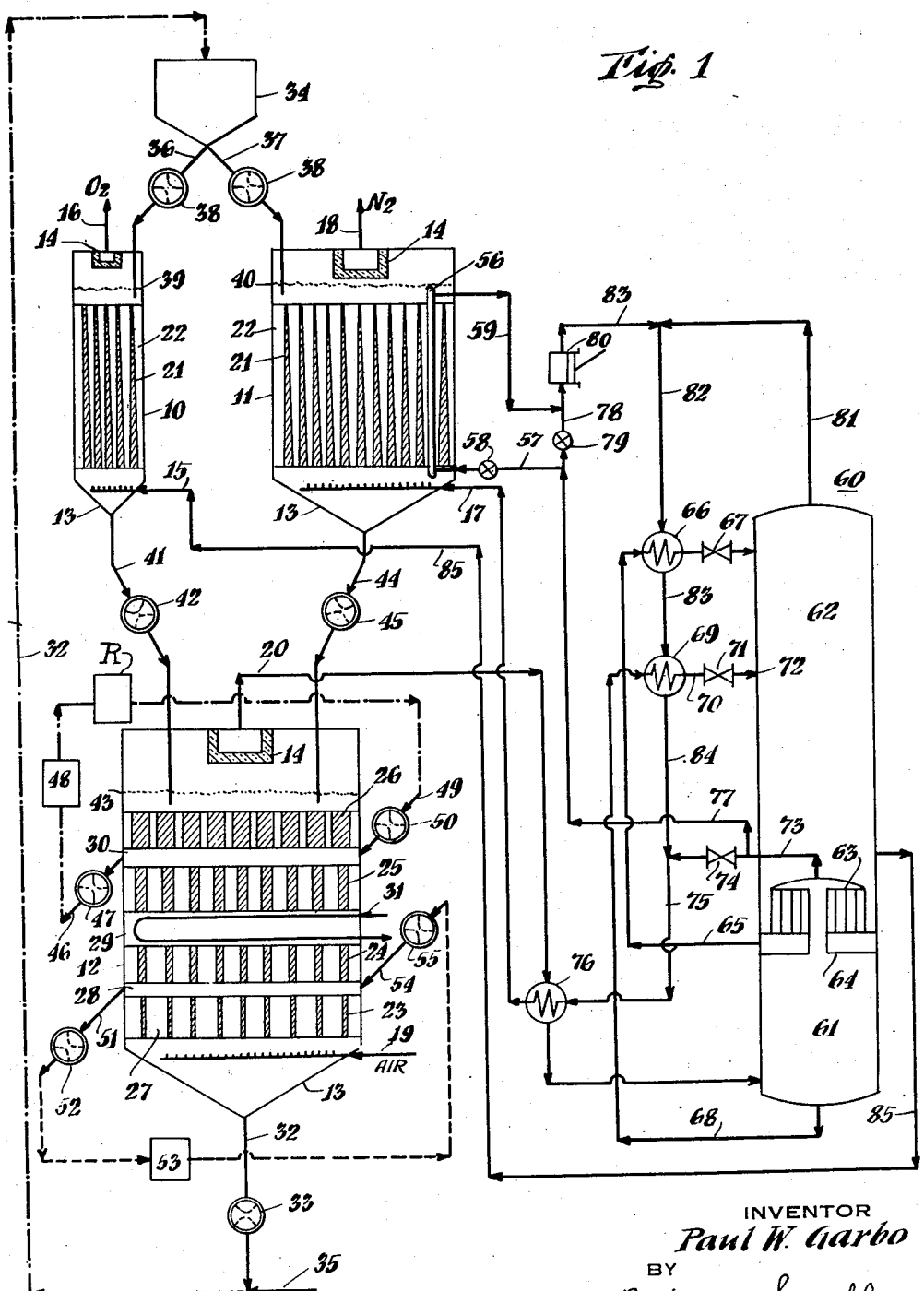
Figure 1 is a schematic vertical section through an apparatus for producing oxygen by the process of this invention; this figure shows two separate exchangers for the flow of oxygen and nitrogen products of rectification therethrough in cold exchange relation with two thermophore streams and a single exchanger for flow of air therethrough in cold exchange relation with the thermophore.

Figure 3 is a schematic vertical section through a modified arrangement of apparatus for producing oxygen by the process of this invention, in which arrangement one exchanger is employed for flow of oxygen and nitrogen products of rectification in cold exchange relationship with the thermophore and a second for flow of the air stream in cold exchange relationship with the thermophore; this figure also discloses an alternative method, as compared with that shown in Figure 1, of supplying the refrigeration necessary to compensate for cold losses resulting from the difference in enthalpy between the incoming air and the outgoing products of rectification and for heat leaks into the system;

Figure 4 is a horizontal section through a rectangular exchanger showing a modified arrangement of longitudinally extending passages or cells;

Figure 5 is a horizontal section through a cylindrical exchanger showing a modified arrangement of longitudinally extending passages or cells;

Figure 6 is a horizontal section through a cylindrical exchanger showing still another arrangement of longitudinally extending passages or cells;

Figure 7 is a horizontal section through another cylindrical exchanger showing still another arrangement of longitudinally extending passages or cells; and Figure 8 is a diagrammatic view showing an alternative arrangement for purging the thermophore; in this modification the thermophore is purged of condensible constituents within the exchanger system whereas in the modifications of Figures 1, 2 and 3 the purging of condensible constituents is effected exteriorly of the exchangers.

In the modification of Figure 1 three exchangers 10, 11 and 12 are employed. The oxygen product of rectification flows through exchanger 10, the nitrogen product of rectification through exchanger 11 which, it will be noted from the drawing, has approximately four times the volumetric capacity of exchanger 10, and air through exchanger 12. Each of these exchangers comprises a conical base portion 13 and has at the top thereof a filter, cyclone separator, electrical precipitator, or other dust removing device 14 through which the gaseous medium leaving the exchanger in question passes, the device 14 removing substantially all entrained thermophore particles carried by the gaseous stream.

Oxygen exchanger 10 is provided with an oxygen inlet pipe 15 and an oxygen exit pipe 16. The nitrogen exchanger 11 is provided with a nitrogen inlet line 17 and a nitrogen exit line 18. The air exchanger 12 is provided with an air inlet line 19 and an air exit line 20.

The oxygen and nitrogen exchangers 10 and 11 have therein a multiplicity of partitions 21 dividing these exchangers into a multiplicity of longitudinally extending passages 22 which substantially prevent top-to-bottom mixing of the thermophore such as would interfere with the maintenance of the desired temperature gradient in the mass of thermophore particles passing through these exchangers. As hereinafter more fully disclosed, partitions 21 may be in the form of tubes or intersecting partitions forming longitudinally extending cells or passages of any desired cross-sectional configuration. The longitudinally extending passages 22 may be elliptical, circular, square or other polygonal shape in cross-section and should be so dimensioned that they have an effective size of a pipe having an internal radius falling within the range of from about ¼" to about 2", preferably from ½" to about 1". Thus, if a passage has an effective pipe size corresponding to an internal radius of say ½", no thermophore particle will be spaced from a wall by a distance more than ½" and the distance between a thermophore particle and the wall farthest away will be 1". With the partitions spaced within the range above indicated, and passing a gaseous medium therethrough at a suitable velocity, readily determined by trial, depending on the density and particle size of the thermophore, intermingling of the thermophore particles is prevented from top to bottom of the passages to an extent sufficient to maintain desired temperature gradient conditions.

In the modification shown in Figure 1, partitions 21 are tapered in cross-section to form channels 22 also tapered in cross-section, i. e., channels 22 have a varying cross-sectional area, the cross-sectional area at the top being greater than that at the bottom. Hence the volumetric space of the channels 22 per unit length thereof progressively increases from bottom to top, thereby compensating for gas expansion with increase in the temperature of the oxygen and nitrogen flowing upwardly through the channels 22 in the oxygen and nitrogen exchangers 10 and 11, respectively.

Air exchanger 12 has four series of partitions 23, 24, 25 and 26 superimposed one above the other. The partitions are of gradually increasing width, i. e., 26 indicates the widest partitions, 23 the narrowest, partitions 24 being somewhat wider than 23, and partitions 25 wider than partitions 24. These partitions thus define longitudinally extending interrupted channels 27 of gradually decreasing cross-sectional area in the direction of air flow from bottom to top of exchanger 12, these longitudinally extending channels may be of any desired cross sectional configuration and are dimensioned, as pointed out above in connection with channels 22, i. e., they have an effective size of a pipe having an internal radius falling within the range of from about 1/4" to about 2", preferably from about 1/2" to about 1". Narrow spaces 28 and 30 and the relatively wider space 29 interconnect these longitudinally extending channels at the points of interruption. Spaces 28 and 30 are generally less than 12" wide, preferably about 2" wide, space 29 being of sufficient width to permit the insertion of a coil 31 for introducing external refrigeration into the system to compensate for cold losses resulting from the difference in enthalpy between the incoming air and the outgoing products of rectification and for heat leaks into the system. For this purpose a refrigerant such as ethylene or carbon tetrafluoride may be passed through the coil 31. Alternatively, a minor portion of the compressed air, say about 7%, may be expanded to lower its temperature, and the thus cooled air passed through the coil 31.

The lateral spaces 28, 29 and 30 function to equalize flow conditions with the several streams of thermophore each in a state of dense phase fluidization passing through the channels 27. The channels 27 each gradually becomes of decreasing cross-sectional area in the direction of air flow upwardly through exchanger 12 to accommodate a decreasing gas volume due to decreasing temperature. It will be understood any desired number of wall sections in exchanger 12 may be used to define the interrupted longitudinally extending channels 27 having the cross-sectional area thereof gradually decrease to provide for optimum air flow conditions through this exchanger and that the arrangement of wall sections 23—26 of different widths provides an alternative method of obtaining substantially the same effect as with the tapered walls 21 in the oxygen and nitrogen exchangers 10 and 11. The latter exchangers may, if desired, be provided with interrupted longitudinally extending channels similar to those in air exchanger 12, except that the channels increase in cross-sectional area from bottom to top.

A thermophore exit line 32 having therein a rotary valve 33 of any well known type leads from the conical base of exchanger 12. Line 32 communicates with a container 34 and may be provided with a nitrogen inlet line 35 to supply effluent nitrogen, say from line 18, to convey the thermophore in a state of suspension therethrough to container 34. A pair of lines 36 and 37, each provided with a rotary valve 38, lead into the oxygen and nitrogen exchangers 10 and 11, these lines terminating below the pseudo-liquid level 39 and 40 in the exchangers 10 and 11, respectively. A line 41 provided with a rotary valve 42 leads from the conical base of exchanger 10 to a point below the pseudo-liquid level 43 of exchanger 12 and a line 44 provided with a rotary valve 45 leads from the conical base of exchanger 11 to a point below the pseudo-liquid level 43 in exchanger 12. Each of the lines 32, 36, 37, 41 and 44 may be provided with aeration tubes for the introduction of gas to facilitate flow of the thermophore therethrough.

Leading from the lateral space 30 of exchanger 12 is a line 46 having therein a rotary valve 47 and this line communicates with a chamber 48 in which purging of the thermophore is effected. Chamber 48, in turn, communicates with a line 49 having therein a rotary valve 50 and discharging into exchanger 12 at a point in the lateral space 30 desirably opposite the point from which the thermophore is withdrawn from this space. A purge line 51 having therein a rotary valve 52 leads from lateral space 28 by way of conveying means (not shown) into a chamber 53. Thermophore is conveyed from chamber 53 to a return line 54 having therein a rotary valve 55 and discharging at a point in lateral space 28 desirably opposite that at which line 51 leads therefrom.

Disposed in one or more of the longitudinally extending channels 22 in exchanger 11 is a unit 56 the function of which will be hereinafter described. This unit may be in the form of a coil or bank of tubes and is provided with an inlet line 57, flow through which is controlled by valve 58, and an exit line 59.

The rectification system comprises, for example, a two-stage rectification column 60, the lower section 61 of which is operated at a pressure of about 72 pounds and the upper section 62 of which is operated at a pressure of from about 2 to about 10 pounds, preferably at about 5 pounds. This column, as is customary, is provided with rectification plates of the bubble-cap or other desired type. The lower section 61 communicates with a condenser 63 and has a liquid collecting shelf 64 disposed immediately below condenser 63 for collecting liquid nitrogen. Pipe 65 leads from this shelf 64 to a heat exchanger 66 which in turn communicates through a pressure reducing valve 67 with the top portion of the upper section 62. Condenser 63 acts as a reboiler for the upper section 62 of the column 60. From the base portion of the lower section 61 a pipe 68 for the flow of crude oxygen (containing approximately 40% oxygen) passes to a heat exchanger 69 which communicates through pipe 70 having a pressure reducing valve 71 therein with the low pressure section 62 at an intermediate point 72.

A line 73 having a pressure reducing valve 74 therein leads from condenser 63 to a nitrogen line 75 communicating by way of heat exchanger 76 with the inlet line 17 to nitrogen exchanger 11. Line 73 is provided with a branch line 77 leading to line 57 entering the unit 56 in exchanger 11. This branch line 77 is provided with a line 78 having a valve 79 therein which leads into an expander 80 of any well known type. A line 81 leads from the top of low pressure section 62 into a line 82 into which also leads line 83 from expander 80. Line 82 extends into the heat exchanger 66; the nitrogen flowing through this line passes through the heat exchanger 66, line 83, heat exchanger 69 and line 84 into line 75. Oxygen line 85 leads from the lower part of the low pressure section 62 to the inlet line 15 in oxygen exchanger 10.

The heat exchangers 66, 69 and 76 and the two-stage fractionating column 60 may be of any conventional type. Two separate fractionating columns suitably interconnected may be used in place of the two-stage column 60 shown. It will be understood that the equipment throughout, including exchangers 10, 11 and 12 and piping connections, is heat insulated to minimize loss of cold.

Figure 2 discloses an air exchanger 86 consisting of two chambers 87 and 88 in lieu of the single exchanger 12 in Figure 1. Parts of Figure 2 which are similar in structure and function to those of Figure 1 have been given like reference characters and it is believed their structure and operation will be evident from the above description of these parts.

In the equipment of Figure 2, the partitions 23 and 24 are disposed in the lower chamber 88 and the partitions 25 and 26 of greater thickness in the upper chamber 87. Lower chamber 88 is provided with an air inlet line 19, the air flowing upwardly through the down flowing thermophore stream in a state of dense phase fluidization, the thermophore stream entering chamber 88 at a point below the pseudoliquid level 89 through a line 90 leading from the base of chamber 87. Line 90 has a rotary valve 91 therein controlling the flow of thermophore therethrough. Leading from the dust removing device 14 at the top of chamber 88 is a line 92 which passes through a refrigeration system 93 supplied with ethylene, carbon tetrafluoride or other suitable refrigerant. A line 94 leads from this refrigeration system into the base of chamber 87.

In the modification of Figure 2 the air stream at a low temperature such that it is completely free of moisture leaves the lower chamber 88 and is further cooled by passing through the refrigeration system 93. An amount of cold is thus introduced adequate to compensate for cold losses due to the difference in enthalpy between the incoming air and the outgoing products of rectification and for heat leaks into the system. In the continued flow of the air through chamber 87 countercurrent to the descending thermophore stream in a state of dense phase fluidization, carbon dioxide is removed from the air stream and deposited on the thermophore particles. A portion of the thermophore particles is withdrawn from the narrow space 30 where the temperature of the thermophore particles is within the range of from about −200° to about −240° F. through line 46, passed through chamber 48 where purging of the carbon dioxide is effected and the thermophore particles returned to space 30 through valve 50 in line 49. A portion of the thermophore particles passing through narrow space 28 at a temperature of from about 30° to about −10° F. is withdrawn through line 51, passed into chamber 53 where the frost is removed from these particles and the purged particles returned to space 28 through valve 55 in line 54. Thus in the apparatus of Figure 2 the air exchanger consists of two separate chambers each having a purging system associated therewith, one chamber being operated under conditions such that all the moisture is removed from the air stream passing therethrough and the other chamber such that the carbon dioxide is removed from the air stream passing therethrough.

The parts of Figure 3 similar to those of Figure 1 have been given like reference numerals, and it is believed the structure and function of these parts will be evident from the above description thereof in connection with Figure 1. The apparatus of Figure 3 differs from that of Figure 1 chiefly in two respects, namely, (1) a single exchanger 95 for recovering the cold content of the outgoing nitrogen and oxygen products of rectification is employed in lieu of the two exchangers 10 and 11, and (2) it involves a different procedure for compensating for cold losses due to the difference in enthalpy between the incoming air and the outgoing products of rectification and for heat leaks into the system.

In the apparatus of Figure 3 exchanger 95 is provided with a series of longitudinally extending channels defined by partitions 21A which are similar to partitions 21 of Figure 1 but, as shown, are not tapered. Disposed within the longitudinally extending channels 22 thus produced is a bank of tubes 96 for flow of oxygen therethrough, these tubes being of copper or other high heat conducting material and preferably provided with internal fins to improve their heat transfer efficiencies. Oxygen line 85 from the rectification system leads into a header 97 from which tubes 96 extend into an exit header 98, the headers 97 and 98 and the oxygen tubes 96 being submerged in the body of thermophore in a state of dense phase fluidization within exchanger 95.

The air exchanger 12 may be similar in construction to that of Figure 1 except that it has disposed within the longitudinally extending channels 27 a bank of tubes 99 having a base header 100 and a top header 101. A branch line 102 leads from the air line 20, for flow of a minor portion, say about 2% by volume, of the cold air leaving through line 20, through the header 101, tubes 99 and header 100. Flow through line 102 is controlled by a valve 103. Another branch line 104 leads from line 20 for flow of another minor portion, say about 18%, of the air therethrough, flow through this line being controlled by a valve 105. The air flowing through lines 100 and 104 (about 20% of the air leaving exchanger 12 by line 20) enters a common line 106 leading into an expander 107 of any well known type from which a line 108 leads into the low pressure stage 62 of the rectification column 60. Instead of dividing the stream of air withdrawn from air line 20 into two portions one of which flowing through line 102 passes through exchanger 12 where the air is heated, the heated air mixing with the other portion withdrawn through line 104, all of the minor portion of the air stream withdrawn from line 20 may be passed through a portion only of exchanger 12 to heat this air to the desired temperature for introduction into expander 107 and the thus warmed air stream introduced into the expander 107 to produce the refrigeration required to compensate for cold losses due to the difference in enthalpy between the incoming air and the outgoing products of rectification and for heat leaks into the system.

In the modification shown in Figure 3 the rectification column 60 is not provided with equipment corresponding to expander 80 and the lines associated therewith employed to effect purging of incondensible gases, such as hydrogen, helium and neon, from the high pressure stage by expanding a minor portion of the nitrogen containing these incondensible gases from the high pressure stage to cool same, imparting the cold thus produced to the rectification products entering the low pressure stage, preferably also to the air entering the high pressure stage, passing the nitrogen through exchanger 11 admixed with nitrogen from the low pressure stage and venting the nitrogen containing the incondensible gases to the atmosphere through line 18. It will be understood that, if desired, such purge system may be employed in the apparatus of Figure 3 or it may be omitted from that of Figure 1.

The exchangers 10, 11 and 12 of Figure 1, 87 and 88 of Figure 2, and those of Figure 3 may be square shaped in horizontal section, as shown, for example, in Figure 4, or cylindrical as shown in Figures 5, 6 and 7, or of any other desired shape. The longitudinal channels in these exchangers, as above pointed out, may be of any desired cross-sectional shape including the shapes shown in Figures 4 to 7, inclusive. In Figure 4 these channels or passages are formed by longitudinally extending cylindrical pipes 109 arranged in the pattern shown within the rectangular housing to provide cylindrical longitudinally extending passageways 110 defined by the inner walls of the pipes and longitudinally extending passageways 111 of somewhat larger cross-sectional extent defined by the outer walls of the pipes; the marginal passageways 112 are defined by the outer walls of the pipes 109 and the inner walls of the rectangular housing.

Figure 5 shows an exchanger having a cylindrical outer wall 114 within which are disposed a plurality of longitudinally extending pipes 115, a plurality of pipes 116 and a plurality of partitions 117 and 118 at right angles to each other and abutting the pipes to provide longitudinally extending passageways 119 defined by the outer walls of the pipes and these partitions and in the case of the marginal passageways 120 by the inner wall of housing 114 also.

Figure 6 shows another arrangement of longitudinally extending passages defined by an outer cylindrical wall 120 having a plurality of concentric inner walls 121 and 122 in which are disposed longitudinally extending pipes 123 and 124 arranged as shown. Thus there are produced longitudinally extending cylindrical conduits or passageways 125 within the pipes 123, longitudinally extending passageways 126 defined by the outer walls of the pipes and the concentric walls 120, 121 and 122, and longitudinally extending passageways 127 defined by the inner walls of pipes 124. In the modifications of Figures 4, 5 and 6 passageways 127 (Figure 6), those within pipes 116 (Figure 5) and those within pipes 113 (Figure 4) may be employed for the flow therethrough of a stream of gas separate and independent from that flowing through the remaining passageways within the exchangers. For example, these passageways may be used for flow of oxygen or other fluid media therethrough while the remaining longitudinally extending passages within the exchanger are used for the flow of nitrogen, thus forming with suitable headers a bank of tubes corresponding to tubes 96 or 99 in the modification of Figure 3, or tubes 56 in exchanger 11 in the modification of Figure 1. The fluids flowing through the longitudinally extending passageways 127 and those within pipes 113 and 116 pass therethrough out of contact with the fluidized thermophore flowing through the remaining passageways within the exchanger.

Figure 7 shows still another arrangement of longitudinally extending passages defined by partition walls 128 and 129 at right angles to each other forming substantially square shaped longitudinally extending channels 130 and marginal longitudinally extending channels 131 of the shapes shown in the drawing.

In the case of the exchangers 10 and 11 of Figure 1 and 95 of Figure 3, the longitudinally extending channels for the flow of fluidized thermophore having any shape such as those shown in Figures 4 to 7 may be continuous from top to bottom of the exchanger, or interrupted at one or more spaced points to provide relatively narrow transverse spaces corresponding, for example, to space 30 of Figure 1. In the exchanger 12 of Figure 1, 87 and 88 of Figure 2 and the air exchanger 12 of Figure 3, any of the modifications of Figures 4 to 7 may be employed, the arrangement of pipes and partitions however being such that transverse narrow spaces corresponding to spaces 30 and 28 of Figures 1, 2 and 3 extending completely across the cross-sectional area of the exchanger are formed. It is to be understood that passages 127 or those within pipes 113 or 116 in which there is no fluidized thermophore may be continuous like tubes 99 in Figure 3.

In all modifications it is important that the longitudinally extending passages be so dimensioned they have an effective size of a pipe having an internal radius falling within the range of from about ¼" to about 2", preferably from ½" to about 1"; otherwise difficulties will be encountered in maintaining the desired temperature gradient conditions in the thermophore particles in a state of dense phase fluidization passing through these longitudinally extending passages.

Purging of the thermophore particles of moisture in chamber 53 and of carbon dioxide in chamber 48 may be accomplished by decreasing the pressure on the thermophore particles in these chambers, say to a pressure of about 5 pounds or to atmospheric pressure, to cause the moisture and carbon dioxide, respectively, to flash off, by heating the thermophore particles to drive off moisture and carbon dioxide, respectively, by passing a gas, e. g., effluent nitrogen from line 18, in contact with the thermophore particles passing through these chambers to remove the moisture and carbon dioxide, respectively, or in any other manner which would be apparent to one skilled in the art. The evaporation of the carbon dioxide and moisture from the thermophore particles by reducing the pressure and flashing off these condensible constituents results in a chilling of the thermophore particles which particles are reintroduced into the air exchanger at a lower temperature than that at which they were withdrawn thereby introducing some refrigeration into the process and reducing the amount of refrigeration introduced, for example, by refrigerating coil 31 (Figure 1) and thus effecting a saving in the operation of the process.

Where the pressure on the thermophore particles has been reduced or the temperature thereof increased, the pressure may be restored and the particles chilled to restore the cold content thereof before they are reintroduced into the air exchanger. If desired, the thermophore particles withdrawn from the air exchanger, after purging may be chilled to a point such that they introduce into the process the refrigeration necessary to compensate for cold losses due to the difference in enthalpy between the incoming air and the outgoing products of rectification and for heat leaks into the system and the thus chilled thermophore particles reintroduced into the air exchanger. For example, the thermophore particles after leaving purge chamber 48 may be passed through a refrigerating unit R (Figure 1) for this purpose. Operating in this manner the coil 31 of Figure 1 or 93 of Figure 2 may be eliminated.

Instead of purging the thermophore particles in separate chambers 48 and 53 as shown in Figure 3 for example, the thermophore particles may be purged within the system as shown in Figure 8. This figure shows diagrammatically equipment of the type shown in Figure 3; like parts in Figures 3 and 8 are indicated by the same reference characters. Referring to Figure 8, the stream of thermophore passing through line 46 and rotary valve 47 containing carbon dioxide and the stream of thermophore passing through line 51 and rotary valve 52 containing frost discharge into the conveyor line 32 which returns the thermophore to exchanger 95 by way of hopper 34, line 36 and rotary valve 38. Any condensed constituents not eliminated from the thermophore while in transit to exchanger 95 are purged by the upward flow of nitrogen in exchanger 95. The thermophore particles thus withdrawn through lines 46 and 51 to avoid accumulation of condensible constituents in exchanger 12 are returned to this exchanger by flowing down through exchanger 95, line 44 and through rotary valve 45.

This invention comprehends the withdrawal of thermophore particles containing condensible constituents from the air exchanger and return thereof at any desired point in the exchanger system. The withdrawn particles may be purged of condensed constituents outside of the exchanger system as in chambers 48 and 53 of Figure 3, or within the exchanger system as in exchanger 95 of Figure 8. In the latter case, to conserve refrigeration, the thermophore particles carrying carbon dioxide are preferably conveyed as a separate stream to the lower or colder portion of exchanger 95 and the thermophore particles carrying frost are preferably conveyed as a separate stream to the upper or warmer portion of exchanger 95.

The rotary valves, 38, 42, 45, 33, 47, 50, 52 and 55 of Figure 1 and the rotary valves of Figures 2 and 3, it will be understood, represent one type of mechanism for permitting withdrawal of thermophore particles from or introduction thereof into the respective units of the apparatus without seriously interfering with the desired pressure conditions therein. Instead of rotary valves, slide valves or other such mechanisms may be employed.

*Example 1*

The following example is illustrative of the operation of the process of this invention to produce oxygen in the equipment of Figure 1 employing powdered copper as the thermophore. It is to be understood the invention is not limited to this example.

Air under pressure of about 75 pounds and a temperature of about 100° F. is supplied through line 19 at a rate sufficient to maintain the powdered thermophore flowing through the longitudinally extending channels 27 in the exchanger 12 constituting zone two of the process in a state of dense phase fluidization. The temperature of the air gradually decreases as it flows countercurrent to the thermophore stream; at 28 the temperature is about 25° F. and at 29 the temperature is about −140° F. In its flow through 29 the air is in indirect heat exchange relation with ethylene passing through refrigerating coil 31. The air then passes through the longitudinally extending channels defined by walls 25 and 26 as well as the transverse space 30 leaving through filter 14 at a temperature of −275° F.; at 30 the temperature is about −215° F. Moisture is removed from the air in the form of frost before the air reaches transverse space 29 by deposition on the thermophore particles flowing downwardly through the channels defined by partitions 24. Carbon dioxide is removed in solidified form during the flow of the air through the longitudinally extending channels defined by partitions 26 and the transverse space 30, the carbon dioxide being deposited on the thermophore particles flowing through these channels. A side stream of about 5% by weight of the total stream of the thermophore particles passing through exchanger 12 is continually removed through line 51 at a temperature of about 25° F. and pressure of about 75 pounds, passed through chamber 53 where the particles are defrosted by heating and then returned through valve 55 in line 54 into transverse space 28 of exchanger 12.

Another side stream of about 3% by weight of the total stream of the thermophore particles passing through exchanger 12 is continually removed through line 46 at a temperature of about −215° F. and pressure of about 75 pounds passed into chamber 48 where the particles are contacted with dry air having a temperature of about −150° F. to effect removal of carbon dioxide therefrom and then returned through valve 50 and line 49 into space 30. The continuous removal of a portion of the thermophore stream containing frost and carbon dioxide, the purging of the particles thus withdrawn, and their reintroduction into the second zone prevents the build-up of condensible constituents or constituents to the point at which the solidified constituents would interfere with the flow of the thermophore particles in a state of dense phase fluidization through the second zone.

The air at a temperature of −275° F. flows through heat exchanger 76 in heat exchange relation with nitrogen and enters high pressure section 61 at a temperature of −278° F. and a pressure of 72 pounds.

Crude oxygen at a temperature of −280° F. and a pressure of 72 pounds leaves the base of section 61, flows through heat exchanger 69 where its temperature is reduced to −289° F. and upon flowing through the pressure reducing valve 71 is flashed, entering low pressure section 62 at a temperature of from about −310° to about −315° F. and a pressure of 5 pounds.

Pure oxygen is withdrawn through line 85 at a temperature of −292.5° F. and a pressure of 5 pounds and enters exchanger 10 through line 15, flowing upwardly countercurrent to the downflowing thermophore stream entering through line 36, the oxygen exiting from exchanger 10 at a temperature of about 95° F. and a pressure of one pound.

Nitrogen at a temperature of about −286.5° F. and a pressure of 72 pounds in amount equal to 12½% by volume of the total nitrogen introduced into the process is withdrawn through line 73. The nitrogen flowing through line 73 may be passed either through line 77 by closing valve 74, or by closing valves 58 and 79 and opening valve 74 through line 75 directly to exchanger 76, and thence to the inlet line 17 of the nitrogen exchanger 11. Preferably nitrogen is passed through line 77, valve 74 being closed, and of the nitrogen flowing through this line about 10% is passed through line 57 and unit 56 its temperature being thus increased to −83° F. The remaining 90% of the nitrogen flows through valve 79 in line 78 and is mixed with the other 10% nitrogen before entering expander 80, the temperature of the mixture being about −273° F. The nitrogen stream at this temperature enters the expander 80 and leaves at a temperature of −315° F. and a pressure of 5 pounds. By preheating a portion of the nitrogen before expansion of the mixture, the temperature of the mixture is increased to the point where no liquid nitrogen is formed within the expander with consequent improvement in the efficiency of the operation of the expander. The expanded nitrogen flows through line 83 into line 82 and mixes with nitrogen at a temperature of —315.5° F. and a pressure of 5 pounds introduced from line 81. The resultant nitrogen stream passes through exchanger 66 in indirect heat exchange relation with nitrogen employed as reflux in section 62, its temperature being thereby increased to —306° F. while the temperature of nitrogen flowing through line 65 (pressure of 72 pounds) into exchanger 66 is reduced to —300° F. This nitrogen by expansion through valve 67 has its pressure reduced to 5 pounds and its temperature to —315.5° F. The effluent nitrogen then flows through line 83 and heat exchanger 69 where its temperature is increased to —293° F. The crude oxygen stream flowing through exchanger 69 is thereby cooled from a temperature of —280° F. to a temperature of —289° F. The nitrogen stream then flows through line 84, line 75, exchanger 76 in heat exchange relation with the air, the nitrogen stream temperature being thereby increased to —279° F. at which temperature and at a pressure of about 5 pounds it enters line 17 and flows upwardly through exchanger 11 at a rate to maintain the thermophore in a state of dense phase fluidization leaving through 18 at a temperature of 95° F. and a pressure of about one pound.

The thermophore stream discharged from the heat exchanger 12 at a temperature of about 97° F. by way of line 32 flows downwardly through the longitudinally extending channels 22 in exchangers 10 and 11, constituting the first zone of the process, in a state of dense phase fluidization countercurrent to the upwardly flowing streams of oxygen and nitrogen, respectively. A descending temperature gradient is thus maintained in the thermophore stream flowing through exchangers 10 and 11 and an ascending temperature gradient in the oxygen and nitrogen streams. The thermophore streams leave exchangers 10 and 11 at temperatures approximating those of the gas streams entering these exchangers. The average temperature of the thermophore particles entering air exchanger 12 is about —280° F.

*Example 2*

The following example is illustrative of the operation of the process of this invention to produce oxygen in the equipment of Figure 3 employing powdered copper as the thermophore. It is to be understood this invention is not limited to this example.

Air at a pressure of about 75 pounds gauge and a temperature of 95° F. is admitted through line 19 at a rate sufficient to maintain the powdered thermophore circulating through the longitudinally extending transversely interrupted channels in exchanger 12 constituting zone two of the process in a state of dense phase fluidization. The temperature of the air as it flows countercurrent to the thermophore stream gradually decreases to about 30° F. at transverse space 28, to about —210° F. at transverse space 30 and to about —276° F. where it leaves exchanger 12. The thermophore stream enters at a temperature of about —283° F., flows downwardly through the longitudinally extending interrupted passages in exchanger 12 in a state of dense phase fluidization, the temperature of the thermophore gradually increasing to about 90° F. at which temperature it enters line 32 and is transported by a suitable conveyor gas such as nitrogen into the chamber 34.

Moisture is removed from the air in the form of frost which is deposited on the thermophore particles flowing downwardly through the interrupted passages just above transverse space 28. Carbon dioxide is removed in solidified form during the flow of the air through the passages above transverse space 30, being deposited on the thermophore particles flowing through the passages above and communicating with space 30. A side stream of about 3% by weight of the total stream of the thermophore particles passing through exchanger 12 is continually removed through line 51 at a temperature of about 30° F. and pressure of about 75 pounds, passed through chamber 53 where the particles are defrosted by heating and then returned through valve 55 in line 54 into space 28 of exchanger 12.

Another side stream of about 2% by weight of the total stream of the thermophore particles passing through exchanger 12 is continually removed through line 46 at a temperature of about —210° F. and pressure of about 75 pounds, passed into chamber 48 where the particles are contacted with dry air having a temperature of about —160° F. to effect removal of carbon dioxide therefrom and then returned through valve 50 and line 49 into space 30.

Most of the air, say 80% by volume (passing through line 20), at a temperature of —276° F. flows through heat exchanger 76 in heat exchange relation with nitrogen and enters high pressure section 61 of column 60 at a temperature of about —277° F. and a pressure of about 72 pounds.

About 2% of the air at a temperature of —276° F. is passed through line 102, valve 103, header 101, bank of tubes 99 leaving through header 100 at a temperature of 82° F. where it mixes with the remaining 18% of the air flowing through line 104 and valve 105 into line 106, the mixture at a temperature of —233° F. entering expander 107. The expanded air at a temperature of —306° F. and a pressure of about 6 pounds flows through line 108 into the low pressure section 62. The amount of refrigeration thus introduced into the system is adequate to compensate for cold losses resulting from the difference in enthalpy between the incoming air and the outgoing products of rectification and for heat leaks into the system.

Nitrogen at a temperature of about —287° F. and a pressure of 72 pounds is withdrawn through line 73 and passes through valve 74, its temperature being reduced to about —315° F. as a result of the expansion through the pressure reducing valve 74. Nitrogen at a temperature of —316° F. and a pressure of about 5.5 pounds is withdrawn through line 81 and flows through line 82, heat exchanger 66, where its temperature is raised to about —303° F. The nitrogen flows from heat exchanger 66 through heat exchanger 69 and mixes with that from line 73; the combined nitrogen stream thus produced at a temperature of —293° F. flows through line 75 into heat exchanger 76 where the temperature of the nitrogen is raised to —288° F. The nitrogen at this temperature and a pressure of about 5 pounds enters inlet 17 to chamber 95.

The temperature and pressure of the oxygen and nitrogen streams employed as reflux and introduced through lines 68 and 65 into the low pressure section 62 are substantially the same as in Example 1.

The nitrogen flows upwardly through the longitudinally extending passages in exchanger 85 maintaining the thermophore powder in a state of dense phase fluidization, the nitrogen leaving through exit line 18 at a temperature of about 88° F.

An ascending temperature gradient is thus maintained in the nitrogen stream flowing through exchanger 10 constituting the first zone of the process. Oxygen at a temperature of —293° F. flows through line 85, header 97 and bank of tubes 99, exiting through header 98 at a temperature of about 85° F. The thermophore particles enter this zone at a temperature of 90° F. and leave through pipe 44 at a temperature of approximately —283° F. Thus a descending temperature gradient in the direction of the thermophore flow is maintained in the stream of thermophore passing through this zone.

The above examples are given for purposes of illustration only. The preferred temperature and pressure conditions may vary within the following ranges: The oxygen may be introduced into the oxygen exchanger at a temperature of from about —280° to about —295° F.; the nitrogen may be introduced into the nitrogen exchanger at a temperature of from about —270° to about —290° F. The thermophore particles may be introduced into these exchangers at a temperature of from about 70° to about 110° F. The thermophore may be withdrawn from these exchangers at a temperature close to that of the entering oxygen and nitrogen and the oxygen and nitrogen at a temperature close to that of the entering thermophore. The thermophore may be introduced into the air exchanger at a temperature of from about —265° to about —280° F. and passed downwardly countercurrent to the air stream introduced at a temperature of from about 70° to about 110° F. The thermophore may be withdrawn from the air exchanger at a temperature approaching that of the entering air and at this temperature introduced into the oxygen and nitrogen exchangers. The air may be withdrawn from the air exchanger at a temperature approaching that of the entering thermophore.

The pressure conditions within the air exchanger may be maintained at from about 60 to about 100 pounds. The pressure conditions within the nitrogen and oxygen exchangers may be maintained within the range of about 2 to 10 pounds, preferably about 5 pounds.

In the practice of the process the air is cooled by direct heat exchange with the chilled thermophore stream to a temperature close to but somewhat above its dew point under the pressure conditions prevailing in this heat exchange zone so that substantially none of the air is liquefied. Operating in this manner substantially all of the carbon dioxide is removed from the air and at the same time liquefaction of the air, such that fluidization of the thermophore particles would be impaired, is avoided.

It will be noted the process of this invention involves the flow of a thermophore in a state of dense phase fluidization in direct cold exchange relation first with nitrogen and/or oxygen rectification product and then with air while maintaining temperature gradients in each zone of thermophore flow, and this results in most efficient cold recovery. Moisture and carbon dioxide are condensed out of the air stream in the cooling thereof, as hereinabove described, deposited on separate portions of the thermophore stream maintained in a state of dense phase fluidization by the air stream and some of these portions periodically or continuously removed, treated to effect purging of moisture and carbon dioxide and returned to the zone wherein air is cooled, thereby avoiding build-up of deposited moisture and carbon dioxide to a point at which the condensed constituents would interfere with the flow of the thermophore in a state of dense phase fluidization. It is preferred to effect removal of moisture and carbon dioxide both in accordance with the process of this invention. It will be understood, however, that if desired one condensible constituent may be removed say by chemical treatment and the other or others by the process of this invention, and this invention includes such variations in the preferred process.

Since certain changes may be made in carrying out the above process without departing from the scope of the invention, it is intended that all matter contained in the above description shall be interpreted as illustrative and not in a limiting sense.

What is claimed is:

1. In a method of producing oxygen by the liquefaction and rectification of air, the improvement which comprises passing a mass of thermophore particles downwardly through a zone countercurrent to an upwardly rising stream of a rectification product thereby maintaining said thermophore particles in a state of dense phase fluidization, maintaining a descending temperature gradient in the mass of thermophore particles and as ascending temperature gradient in the rectification product stream, passing a stream of thermophore particles withdrawn from said zone downwardly through a second zone countercurrent to an upwardly rising stream of air thereby maintaining said stream of thermophore particles in a state of dense phase fluidization, maintaining a descending temperature gradient in the air stream and an ascending temperature gradient in the thermophore stream, removing a portion of the thermophore particles containing a condensible constituent removed from the air stream from said second zone, treating the thermophore particles thus removed to effect the elimination therefrom of said condensible constituent and returning the thus treated thermophore particles to the process.

2. In a method of producing oxygen by the liquefaction and rectification of air, the improvement which comprises passing a mass of thermophore particles downwardly through a zone countercurrent to an upwardly rising stream of a rectification product thereby maintaining said thermophore particles in a state of dense phase fluidization, maintaining a descending temperature gradient in the mass of thermophore particles and an ascending temperature gradient in the rectification product stream, passing a stream of thermophore particles withdrawn from said zone downwardly through a second zone countercurrent to an upwardly rising stream of air thereby maintaining said stream of thermophore particles in a state of dense phase fluidization, maintaining a descending temperature gradient in the air stream and an ascending temperature gradient in the thermophore stream thereby cooling said air stream so that condensible constituents are removed therefrom and deposited on the thermophore particles, and purging a portion of the thermophore particles to effect the removal of said condensible constituents therefrom and prevent the build-up of said condensible constituents in said second zone to a point at which said constituents prevent the maintenance of said stream of thermophore particles in a state of dense phase fluidization.

3. The method as defined in claim 2, in which the refrigeration to compensate for cold losses due to the difference in enthalpy between the incoming air and the outgoing products of rectification and for heat leaks into the system is supplied by removing a minor portion of the air stream withdrawn from the second zone, dividing the minor portion thus removed into two streams, passing one of said streams through the second zone in indirect heat exchange relation with the thermophore stream in said second zone to heat said air stream, mixing the thus heated air stream with the second air stream, expanding the resultant mixture and introducing the expanded air into the rectification system.

4. In a method of producing oxygen by the liquefaction and rectification of air, the improvement which comprises passing a mass of thermophore particles downwardly through a plurality of longitudinally extending channels in one zone countercurrent to an upwardly rising stream of a rectification product thereby maintaining said thermophore particles in a state of dense phase fluidization, maintaining a descending temperature gradient in the thermophore stream and an ascending temperature gradient in the rectification product stream, passing a stream of thermophore particles withdrawn from said zone downwardly through a plurality of longitudinally extending channels in a second zone countercurrent to an upwardly rising stream of air thereby maintaining said stream of thermophore particles in a state of dense phase fluidization maintaining a descending temperature gradient in the air stream and an ascending temperature gradient in the thermophore stream, removing a portion of the thermophore particles containing a condensible constituent removed from the air stream, treating the thermophore particles thus removed to effect the elimination therefrom of said condensible constituent and returning the thus treated thermophore particles to the process.

5. In a method of producing oxygen by the liquefaction and rectification of air, the improvement which comprises passing a mass of thermophore particles downwardly through a plurality of longitudinally extending channels in one zone countercurrent to an upwardly rising stream of a rectification product thereby maintaining said thermophore particles in a state of dense phase fluidization, maintaining a descending temperature gradient in the mass of thermophore particles and an ascending temperature gradient in the rectification product stream, passing a stream of thermophore particles withdrawn from said zone downwardly through a plurality of longitudinally extending channels in a second zone countercurrent to an upwardly rising stream of air thereby maintaining said stream of thermophore particles in a state of dense phase fluidization, maintaining a descending temperature gradient in the air stream and an ascending temperature gradient in the thermophore stream thereby cooling said air stream so that condensible constituents are removed therefrom and deposited on the thermophore particles, and continuously circulating a portion of the thermophore particles having said condensible constituents thereon through a treatment zone where said condensible constituents are removed and thence back to said second zone thereby preventing the build-up of said condensible constituents in said second zone to a point which would prevent the maintenance of said stream of thermophore particles in a state of dense phase fluidization.

6. In a method of producing oxygen by the liquefaction and rectification of air, the improvement which comprises passing a mass of thermophore particles downwardly through a plurality of longitudinally extending channels in one zone countercurrent to an upwardly rising stream of nitrogen rectification product thereby maintaining said thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone, countercurrent to an upwardly rising stream of air thereby maintaining said stream of thermophore particles in a state of dense phase fluidization, maintaining a descending temperature gradient in the air stream and an ascending temperature gradient in the thermophore stream, continuously removing a portion of the thermophore particles containing carbon dioxide removed from the air stream, continuously treating the thermophore particles thus removed to effect the elimination therefrom of said carbon dioxide and continuously returning the thus treated thermophore particles to the process.

7. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen rectification product thereby maintaining said thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone countercurrent to an upwardly rising stream of said air thereby maintaining said stream of thermophore particles in a state of dense phase fluidization, maintaining a descending temperature gradient in the air stream and an ascending temperature gradient in the thermophore stream thereby condensing said moisture on the thermophore particles in the lower portion of said thermophore stream and the carbon dioxide in the upper portion of said thermophore stream, removing a portion of the thermophore particles containing condensed moisture and separately removing a portion of the thermophore particles containing carbon dioxide, treating the thermophore particles thus removed to effect the elimination therefrom of said moisture and carbon dioxide and returning the thus treated thermophore particles to the process.

8. In a method of producing oxygen by the liquefaction and rectification of air, the improvement which comprises passing a mass of thermophore particles initially at a temperature of from about 70° to about 110° F. downwardly through a plurality of longitudinally extending channels in one zone counter-current to an upwardly rising stream of nitrogen introduced into said zone at a temperaure of from about —270° to about —290° F., thereby maintaining said thermophore particles in a state of dense phase thereby maintaining said stream of thermophore particles in a state of dense phase fluidization, said longitudinally extending channels being interconnected by narrow spaces, one of said spaces being disposed in the second zone where the temperature of the thermophore particles is from about 30° to about −10° F. and another of said spaces being disposed in said second zone at a point where the temperature of the thermophore particles is from about −200° to about −240° F., withdrawing the thermophore particles from the base of said second zone at a temperature within 3° F. of the temperature of the incoming air and the air from the top of said zone at a temperature within 3° F. of the temperature of the incoming thermophore particles, thereby condensing said moisture in one portion of the thermophore stream and the carbon dioxide in another portion of the thermophore stream continuously removing a portion of the thermophore particles in the narrow space at a temperature of from about 30° to about −10° F., continuously treating the thermophore particles thus removed to eliminate moisture thereon and continuously returning the thus treated thermophore particles to the narrow space from which they were withdrawn and continuously removing the portion of the thermophore particles in the narrow space at a temperature of from about −200° to about −240° F., continuously treating the thermophore particles thus removed to effect the elimination of carbon dioxide therefrom and continuously returning the thus treated thermophore particles to the narrow space from which they were withdrawn.

12. In a method of producing oxygen by the liquefaction and rectification of air containing carbon dioxide, the improvement which comprises passing a mass of thermophore particles downwardly through a plurality of longitudinally extending channels in one zone countercurrent to an upwardly rising stream of nitrogen rectification product thereby maintaining said mass of thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone countercurrent to an upwardly rising stream of air, thereby maintaining said stream of thermophore particles in a state of dense phase fluidization, maintaining a descending temperature gradient in the air stream and an ascending temperature gradient in the thermophore stream, thereby cooling said air stream to a temperature such that carbon dioxide is removed therefrom and deposited on the thermophore particles and continuously circulating a portion of the thermophore particles having said carbon dioxide deposited thereon through a treatment zone where said carbon dioxide is removed and thence back to said second zone thereby preventing the build-up of said carbon dioxide in said second zone to a point which would prevent the maintenance of said thermophore particles in a state of dense phase fluidization.

13. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen rectification product thereby maintaining said mass of thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone countercurrent to an upwardly rising stream of air thereby maintaining said stream of thermophore particles in a state of dense phase fluidization, maintaining a descending temperature gradient in the air stream and an ascending temperature gradient in the thermophore stream, thereby cooling said air stream so that condensable constituents are removed therefrom and deposited on the thermophore particles and continuously circulating a portion of the thermophore particles having said condensable constituents thereon through a treatment zone where said condensable constituents are removed and thence back to said second zone thereby preventing the build-up of said condensable constituents in said second zone to a point which would prevent the maintenance of said thermophore particles in a state of dense phase fluidization.

14. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen introduced into said zone at a temperature of from about −270° to about −290° F. thereby maintaining said mass of thermophore particles in a state of dense phase fluidization withdrawing the thermophore particles from the base of said zone at a temperature close to that of the incoming nitrogen and the nitrogen from the top of said zone at a temperature close to that of the incoming thermophore particles, passing a stream of thermophore particles withdrawn from said zone downwardly through a plurality of longitudinally extending channels in a second zone countercurrent to a rising stream of air introduced at a temperature of from about 70° to about 110° F. thereby maintaining said thermophore in a state of dense phase fluid'zation, withdrawing the thermophore partic'es from the base of said zone at a temperature close to that of the entering air and the air from the top of said zone at a temperature close to that of the entering thermophore particles, thereby cooling said air stream so that said moisture and said carbon dioxide are removed therefrom and deposited on the thermophore particles and continuously removing and circulating a portion of the thermophore particles having deposited moisture thereon from one portion of said second zone, removing and circulating thermophore particles, having deposited carbon dioxide thereon, from another portion of said second zone, and treating said particles thus removed to eliminate carbon dioxide and moisture therefrom.

15. The method of recovering the cold content of a nitrogen product of rectification in the liquefaction of air to produce oxygen, which comprises passing a mass of thermophore particles downwardly through a zone countercurrent to an upwardly rising stream of the nitrogen rectification product thereby maintaining said mass of thermophore particles in a state of dense phase fluidization, withdrawing the thermophore particles from the base of said zone at a temperature close to that of the incoming nitrogen stream and the nitrogen from the top of said zone at a temperature close to that of the incoming thermophore stream, passing a stream of thermophore particles withdrawn from said zone downwardly through a plurality of longitudinally extending channels in a second zone countercurrent to an upwardly rising stream of air introduced at a temperature of from about 70° to about 110° F. thereby maintaining said stream of thermophore particles in a state of dense phase fluidization, withdrawing the thermophore particles from the base of said zone at a temperature close to that of the incoming air stream and the air from the top of said zone at a temperature close to that of the incoming thermophore stream, continuously removing a portion of the thermophore particles containing carbon dioxide removed from the air stream from the portion of the thermophore stream at a temperature of from about −200° to about −240° F., continuously treating the thermophore particles thus removed to effect the elimination therefrom of the carbon dioxide and continuously returning the thus treated thermophore particles to the second zone.

9. In a method of producing oxygen by the liquefaction and rectification of air containing moisture and carbon dioxide, the improvement which comprises passing masses of thermophore particles initially at a temperature of from about 70° to about 110° F. downwardly through a plurality of longitudinally extending channels in one zone countercurrent to upwardly rising streams of oxygen and nitrogen rectification products introduced into said zone at temperatures of from about −280° to about −295° F. and from about −270° to about −290° F., respectively, thereby maintaining said masses of thermophore particles in a state of dense phase fluidization, withdrawing the thermophore particles from the base of said zone at a temperature close to that of the incoming nitrogen stream and the oxygen and nitrogen from the top of said zone at a temperature close to that of the incoming thermophore stream, passing a stream of thermophore particles withdrawn from said zone downwardly through a plurality of longitudinally extending channels in a second zone countercurrent to an upwardly rising stream of air introduced at a temperature of from about 70° to about 110° F. thereby maintaining said stream of thermophore particles in a state of dense phase fluidization, withdrawing the thermophore particles from the base of said zone at a temperature close to that of the incoming air stream and the air from the top of said zone at a temperature close to that of the incoming thermophore stream thereby condensing said moisture in one portion of the thermophore stream and the carbon dioxide in another portion of the thermophore stream, continuously removing a portion of the thermophore particles containing condensed moisture from the portion of the thermophore stream having a temperature of from about 30° to about −10° F., treating the thermophore particles thus removed to effect the elimination of moisture therefrom and continuously returning the thus treated thermophore particles to the portion of the thermophore stream from which they were removed and continuously and separately removing a portion of the thermophore stream having a temperature from about −200° to about −240° F. and having carbon dioxide deposited thereon, treating the thermophore particles thus removed to eliminate carbon dioxide therefrom and continuously returning the thus treated thermophore particles to the portion of the thermophore stream from which they were removed.

10. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen rectification product thereby maintaining said thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone countercurrent to an upwardly rising stream of air thereby maintaining said stream of thermophore particles in a state of dense phase fluidization, maintaining a descending temperature gradient in the air stream and an ascending temperature gradient in the thermophore stream whereby carbon dioxide and moisture are condensed out of said air stream, said longitudinally extending channels being interconnected by narrow spaces disposed at at least two spaced points along the length of said longitudinally extending channels, one of said points occurring along the length of the flow of the air stream wherein carbon dioxide condenses out of the air stream and the other wherein moisture condenses out of the air stream, continuously removing a portion of the thermophore particles containing carbon dioxide from one of said narrow spaces, continuously treating the thermophore particles thus removed to effect the elimination of the carbon dioxide therefrom and continuously returning the thus treated thermophore particles to the narrow space from which it was withdrawn and continuously removing a portion of the thermophore particles containing frost from another of said narrow spaces, continuously treating the thermophore particles thus removed to effect the elimination of the frost therefrom and continuously returning the thus treated thermophore particles to the narrow spaces from which they were withdrawn.

11. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen rectification product thereby maintaining said mass of thermophore particles in a state of dense phase fluidization, said nitrogen rectification product being introduced into said zone at a temperature of from about −270° to about −290° F., withdrawing the thermophore particles from the base of said zone at a temperature within 3° F. of the temperature of the nitrogen introduced into said zone and withdrawing the nitrogen from the top of said zone at a temperature within 3° F. of the thermophore entering said zone, passing a stream of thermophore particles withdrawn from said zone downwardly through a plurality of longitudinally extending channels in a second zone countercurrent to an upwardly rising stream of air at a temperature of from about 70° to about 110° F.

fluidization, maintaining a descending temperature gradient in the mass of thermophore particles and an ascending temperature gradient in the rectification product stream, passing a stream of thermophore particles withdrawn from said zone downwardly through a second zone countercurrent to an upwardly rising stream of air at a pressure of from about 60 to about 100 pounds thereby maintaning said stream of thermophore particles in a state of dense phase fluidization, maintaining a descending temperature gradient in the air stream and an ascending temperature gradient in the thermophore stream thereby cooling said air stream so that condensible constituents are removed therefrom and deposited on the thermophore particles, purging a portion of the thermophore particles to effect the removal of said condensible constituents therefrom and prevent the build-up of said condensible constituents in said second zone to a point which would prevent the maintenance of said thermophore particles in a state of dense phase fluidization, withdrawing the air stream from the second zone, passing the major portion of the air stream thus withdrawn into the high pressure stage of a two stage rectification system, warming the remaining minor portion of the said air stream by passing it in indirect heat exchange relation with said thermophore particles, expanding the warmed air stream and introducing the expanded air into the low pressure stage of said rectification system thereby introducing into the process an amount of cold adequate to compensate for cold losses due to the difference in enthalpy between the incoming air and the outgoing products of rectification and for heat leaks into the system.

16. The method of producing oxygen by the liquefaction and rectification of air, which comprises passing a mass of thermophore particles downwardly through a plurality of longitudinally extending channels in one zone countercurrent to an upwardly rising stream of nitrogen rectification product thereby maintaining said mass of thermophore particles in a state of dense phase fluidization, maintaining a desecending temperature gradient in the mass of thermophore particles and an ascending temperature gradient in the nitrogen stream, passing a stream of thermophore particles withdrawn from said zone downwardly through a plurality of longitudnally extending channels in a second zone, countercurrent to an upwardly rising stream of air thereby maintaining said stream of thermophore particles in a state of dense phase fluidization, maintaining a descending temperature gradient in the air stream and an ascending temperature gradient in the thermophore stream, continuously removing a portion of the thermophore particles containing a condensible constituent removed from the air stream, continuously treating the thermophore particles thus removed to effect the elimination therefrom of said condensible constituent, continuously returning the thus treated thermophore particles to the second zone, withdrawing the air stream from the second zone at a temperature close to that of the nitrogen introduced into the first zone, passing the air into the high pressure stage of a two stage rectification system, withdrawing from the high pressure stage a minor portion of the total nitrogen introduced into the process, said nitrogen containing incondensible gases, warming the said minor portion by passing it in indirect heat exchange relation with said termophore particles, expanding the warmed nitrogen and passing the expanded nitrogen in heat exchange relation with the crude oxygen and nitrogen streams supplied as reflux to the low pressure stage and with the air supplied to the high pressure stage of the rectification system, and then passing the nitrogen to the first mentioned zone for flow therethrough in an upward direction countercurrent to the downwardly flowing mass of thermophore particles.

17. In a method of producing oxygen by the liquefaction and rectification of air, the improvement which comprises passing a mass of thermophore particles downwardly through a zone countercurrent to an upwardly rising stream of a rectification product thereby maintaining said mass of thermophore particles in a state of dense phase fluidization, maintaining a descending temperature gradient in the mass of thermophore particles and an ascending temperature gradient in the rectification product stream, passing a stream of thermophore particles withdrawn from said zone downwardly through a second zone countercurrent to an upwardly rising stream of air thereby maintaining said stream of thermophore particles in a state of dense phase fluidization, maintaining a descending temperature gradient in the air stream and an ascending temperature gradient in the thermophore stream, removing a portion of the thermophore particles containing a condensible constituent removed from the air stream from said second zone and introducing the thermophore particles thus withdrawn into the first mentioned zone where said rectification product effects removal of said condensible constituent from said thermophore particles.

18. In a method of producing oxygen by the liquefaction and rectification of air containing moisture and carbon dioxide, the improvement which comprises passing a mass of thermophore particles downwardly through a plurality of longitudinally extending channels in one zone countercurrent to an upwardly rising stream of nitrogen rectification product thereby maintaining said mass of thermophore particles in a state of dense phase fluidization, maintaining a descending temperature gradient in the mass of thermophore particles and an ascending temperature gradient in the nitrogen stream, passing a stream of thermophore particles withdrawn from said zone downwardly through a plurality of longitudinally extending channels in a second zone countercurrent to an upwardly rising stream of air thereby maintaining said stream of thermophore particles in a state of dense phase fluidization, maintaining a descending temperature gradient in the air stream and an ascending temperature gradient in the thermophore stream thereby condensing said moisture on the thermophore particles in the lower portion of said thermophore stream and the carbon dioxide in the upper portion of said thermophore stream, removing a portion of the thermophore particles containing condensed moisture and separately removing a portion of the thermophore particles containing carbon dioxide, introducing the thermophore particles thus removed into the mass of thermophore particles flowing through said first mentioned zone countercurrent to the upwardly rising stream of nitrogen rectification product whereby said nitrogen rectification product stream effects removal of the condensed moisture and carbon dioxide from said thermophore particles containing same.

19. In a process of producing oxygen by the liquefaction and rectification of air, the improvement which comprises passing a mass of thermophore particles downwardly through a zone countercurrent to an upwardly rising stream of a rectification product thereby maintaining said mass of thermophore particles in a state of dense phase fluidization, maintaining a descending temperature gradient in the mass of thermophore particles and an ascending temperature gradient in the rectification product stream, passing a stream of thermophore particles withdrawn from said zone downwardly through a second zone countercurrent to an upwardly rising stream of air thereby maintaining said stream of thermophore particles in a state of dense phase fluidization, maintaining a descending temperature gradient in the air stream and an ascending temperature gradient in said stream of thermophore particles, removing a portion of the thermophore particles containing a condensible constituent removed from the air stream from said second zone, treating the thermophore particles thus removed to effect the elimination therefrom of said condensible constituent, chilling the thermophore particles thus withdrawn, and returning the chilled thermophore particles to the process thereby introducing into the process the refrigeration necessary to compensate for cold losses due to the difference in enthalpy between the incoming air and the outgoing products of rectification and for heat leaks into the system.

PAUL W. GARBO.

REFERENCES CITED

The following references are of record in the file of this patent:

UNITED STATES PATENTS

| Number | Name | Date |
|---|---|---|
| 1,178,667 | Niewerth | Apr. 11, 1916 |
| 1,871,166 | Fahrbach | Aug. 9, 1932 |
| 2,360,468 | Brown | Oct. 17, 1944 |

FOREIGN PATENTS

| Number | Country | Date |
|---|---|---|
| 525,197 | Great Britain | Aug. 23, 1940 |